United States Patent [19]

Kubo et al.

[11] Patent Number: 5,220,357
[45] Date of Patent: Jun. 15, 1993

[54] IMAGE FORMING METHOD AND APPARATUS

[75] Inventors: Masahiko Kubo; Toshiaki Sagara; Kazuhiko Arai, all of Kanagawa, Japan

[73] Assignee: Fuji Xerox Co., Ltd., Tokyo, Japan

[21] Appl. No.: 933,495

[22] Filed: Aug. 21, 1992

[51] Int. Cl.$^5$ .................... G01D 15/06; G03G 15/01; G03G 15/04

[52] U.S. Cl. ................ 346/153.1; 346/157; 355/246; 355/326

[58] Field of Search ........ 355/208, 214, 246, 326–328; 346/153.1, 157, 160

[56] References Cited

U.S. PATENT DOCUMENTS 4,617,580  10/1986  Miyakawa ............................ 346/136
5,049,937   9/1991  Takeda ................................ 355/245

FOREIGN PATENT DOCUMENTS 60-52861A  3/1985  Japan .
63-80273A  4/1988  Japan .

*Primary Examiner*—R. L. Moses
*Attorney, Agent, or Firm*—Finnegan, Henderson, Farabow, Garrett & Dunner

[57] ABSTRACT

Disclosed is an image forming apparatus and method for forming a color toner image on a transparent overhead projector film, characterized in that the product of the height of the color toner image construction h and the spatial frequency $1/\lambda$ is 0.036 or less. The height of the image construction h can be determined by varying the toner weight per unit area on the transparent film and the spatial frequency $1/\lambda$ can be determined by varying the resolution so that $h/\lambda$ the is 0.036 or less. An image forming apparatus comprises an electrostatic latent image receiving member, an electrostatic latent image forming means for forming an electrostatic latent image corresponding to an image signal having a predetermined number of screen lines on the electrostatic latent image receiving member, a transfer medium detecting means for detecting the transfer medium, and a pulse width modulation means for modulating the pulse width of the image signal based on the detection result from the transfer medium detecting means.

6 Claims, 4 Drawing Sheets

DEVELOPING BIAS POWER SUPPLY

PROCESS CONTROL MEANS

| h(μm) \ λ(μm) | 254 (100 lpi) | 180 (141 lpi) | 127 (200 lpi) | 64 (400 lpi) |
|---|---|---|---|---|
| 2 | OK ($h/\lambda=0.008$) | OK ($h/\lambda=0.011$) | OK ($h/\lambda=0.016$) | OK ($h/\lambda=0.031$) |
| 4 | OK ($h/\lambda=0.016$) | OK ($h/\lambda=0.022$) | OK ($h/\lambda=0.031$) | NG ($h/\lambda=0.063$) |
| 5 | OK ($h/\lambda=0.020$) | OK ($h/\lambda=0.028$) | NG ($h/\lambda=0.039$) | NG ($h/\lambda=0.078$) |
| 8 | OK ($h/\lambda=0.031$) | NG ($h/\lambda=0.044$) | NG ($h/\lambda=0.063$) | NG ($h/\lambda=0.125$) |

OK  CONTOUR DOES NOT OCCUR
NG  CONTOUR OCCURS

IMAGE FORMING METHOD AND APPARATUS

BACKGROUND OF THE INVENTION

1. Field of the Invention

The present invention relates to an apparatus and a method for forming a color toner image on paper or transparent overhead projector film by electrophotography.

2. Discussion of the Related Art

It has been conventional practice to form an image with color toner on a transparent film by the electrophotographic method, and project the image on a screen by an overhead projector or the like, but there is a tendency for contour to occur because the image to be projected is dark and indistinct in the parts of low or medium density. The cause of this phenomenon is considered to be that the fuser can sufficiently flatten the surface of the toner image in parts of high density, but the surface of the toner image in the parts of low density retains its unevenness, and light scattering caused by the unevenness of the toner surface affects the projected image. However, the precise cause of this phenomenon is not as yet known.

When using transparent film, to prevent the scattering of transmitted light, a method for flattening a surface of a toner image by spraying it with lacquer or the like has been considered. Japanese Patent Application Unexamined Publication (laid - open) No. Sho. 63-80273 (1988) discloses a method for removing tiering and gapping among toner by changing the shape of the toner particles and fusing them together into a single body to form a toner image with sufficiently even surface.

Further, the conventional electrophotographic method produces high refraction of the incident light at the interface of the toner and the air, and therefore it can only provide a dark projected image with low chroma.

To solve the problem mentioned above, a method for fusing the toner at a temperature in which the toner melts completely is also disclosed in Japanese Patent Application Unexamined Publication (laid - open) No. Sho. 63-80273 (1988). Japanese Patent Application Unexamined Publication No. Sho. 60-52861 (1985) describes a method for processing the surface of a color toner image to make the value of the surface roughness RZ as prescribed by JIS B0601-1982 a 10-point roughness height of 0.8 $\mu$m.

However, in the method for flattening a surface of a toner image by spraying with lacquer or the like, there is the problem that the toner forming the image dissolves in the solvent, and thus the projected image loses its sharpness, color puddles appear, or discoloration occurs in the part where no toner image is formed. In addition, this method is not very efficient.

On the other hand, in the method for flattening the surface of the toner layer by changing the shape of the toner particles and fusing them into a single body, it is necessary to make the temperature of the fuser higher when using transparent film than when using paper in order to melt the toner sufficiently, which causes the problem of delays occurring when the transfer medium is changed. Further, mechanically smoothing the surface of the fused toner image requires an additional abrading device.

Attempting to make the parts of the image with less toner, that is the medium-density portions of the image, sufficiently smooth by a method of roller fusing at a high temperature as described in Japanese Patent Application Unexamined Publication No. Sho. 63-80273 (1988), tends to produce offset in portions with a large amount of toner. For this reason, although the surface of the toner image in portions of high density can be made adequately smooth, in the portions of medium density unevenness remains, whereby the incident light is scattered, and contour occurs in the medium-density portions of the image. Thus contour sometimes occurs in the medium-density portions of the image.

In particular, because a digital color copying machine controls the density of each color by variation of the area of very fine dots or lines, unevenness of the surface of the toner image is caused by the dots and lines of the halftone portions of the image; accordingly contour on the toner surface in the halftone portions tends to occur in the process of making a high quality projected image for an overhead projector using a digital color copying machine.

The embodiment of the method described in Japanese Patent Application Unexamined Publication No. Sho. 60-52861 (1985) does not specify an upper limit of the accumulated depth of the toner image construction when unevenness in the image construction has a specific spatial frequency as in a digital color copying machine.

SUMMARY OF THE INVENTION

The present invention has been made in view of the above circumstances and has as an object to provide an image forming apparatus which solves the above-mentioned problems of the conventional apparatuses and forms an image without generating contour in its projected image when the image is formed on a transparent overhead projector film.

A further object of the present invention is to provide a color image forming method which can generate a bright projected image with high chroma and to provide a color image forming method which does not produce contour on a projected image.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the image forming apparatus of this invention comprises an electrostatic latent image receiving member, an electrostatic latent image forming means for forming an electrostatic latent image corresponding to an image signal having a predetermined image density on the electrostatic latent image receiving member, a transfer medium detecting means for detecting the transfer medium and a pulse width modulation means for modulating the pulse width of the image signal based on the detection result from the transfer medium detecting means.

The period of the basic signal changes the number of screen lines. Thus the image forming apparatus according to the present invention changes the number of screen lines depending on the transfer medium.

Lowering the number of screen lines prevents the occurrence of contour on the projected image, but also reduces the resolution. Nevertheless, prevention of the occurrence of contour is more effective in forming an image of high quality than preserving the resolution.

If an image is formed on a transparent overhead projector film, for example, unevenness of the surface of the toner image on the transparent film is reduced by diminishing the number of screen lines so that a projected image without contour is obtained. If paper is used instead of the transparent film, this is detected by the transfer medium detecting means and the normal number of screen lines is used for image processing, thus preserving the resolution.

To achieve the objects, the present invention also relates to an image forming method for forming a toner image corresponding to a digital image signal on a transparent film, comprising the steps of detecting the transfer medium as being a transparent film and controlling the height of a toner image construction h and/or spatial frequency of the toner image $1/\lambda$ so that $h/\lambda$ satisfies a predetermined condition.

More specifically, a characteristic of the present invention is that the height of the image construction formed on the transparent film and the spatial frequency are simultaneously considered and that a process of controlling the product of height of the image construction and the spatial frequency to be 0.036 or less is adopted.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings.

DETAILED DESCRIPTION OF THE PREFERRED EMBODIMENTS

The embodiments of an image forming apparatus according to the present invention will now be described in detail based on the drawings.

First Embodiment

Figure 1:
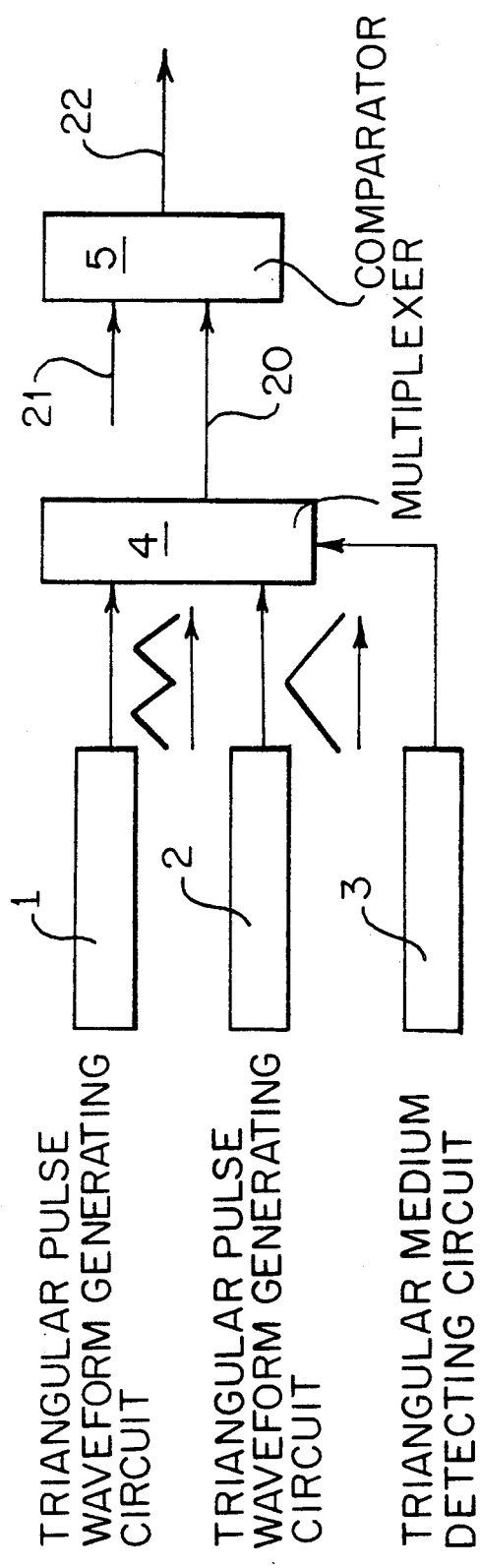
FIG. 1 is a schematic view of the organization of image processing of the image forming apparatus according to the present invention.

FIG. 1 is a schematic view of the organization of image processing in the electrophotographic copying machine as an embodiment of a typical image forming apparatus according to the present invention. Either a signal from a triangular pulse waveform generating circuit 1 when the image is to be formed on plain paper or a signal from a triangular pulse waveform generating circuit 2 when the image is to be formed on the transparent overhead projector film is selected based on a signal from a transfer medium detecting circuit 3 at multiplexer 4, as shown in FIG. 1. A triangular pulse wave signal 20 selected in accordance with the transfer medium is compared to an image signal 21 by a comparator 5 so that a laser drive signal 22 is generated by pulse width modulation.

In this embodiment, the triangular pulse wave generating circuits 1 and 2, the transfer medium detecting circuit 3 and the multiplexer 4 constitute means for generating a basic signal, a means for detecting the transfer medium and a means for selecting the period of the basic signal, respectively. The triangular pulse waveform generating circuit 2 outputs a signal of triangular pulse waveform whose period is longer than that of the signal from the triangular pulse waveform generating circuit 1. These two signals of triangular pulse wave having different periods correspond to the basic signal of the present invention, and thus the period of the basic signal can be regarded as being varied because the multiplexer 4 selects one of those two signals of triangular pulse waveform in accordance with the signal from the transfer medium detecting circuit 3.

Figure 2:
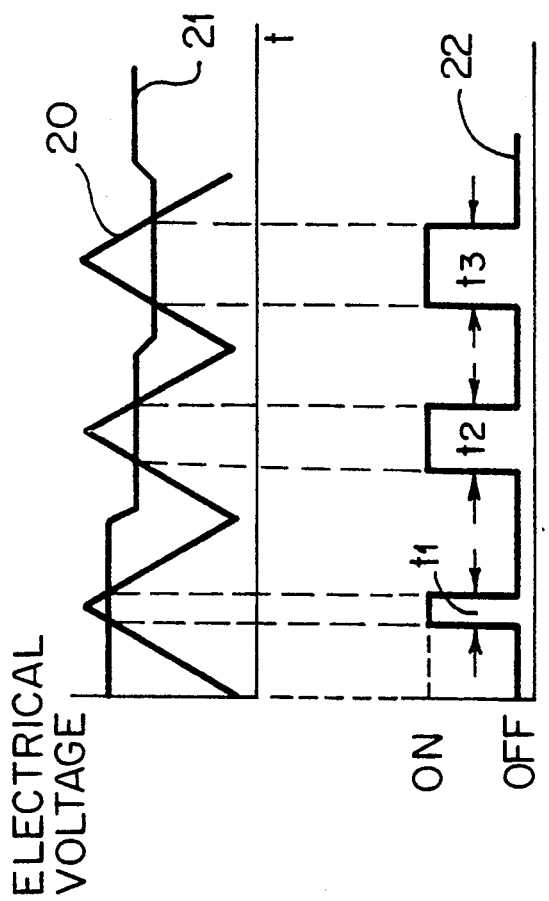
FIG. 2 is a signal waveform diagram showing the input and output signals of the comparator shown in FIG. 1.

FIG. 2 shows the triangular pulse waveform 20 and the image signal 21 which are input to the comparator 5 and the laser drive signal 22 output from the comparator 5. The laser drive signal 22 is a pulse waveform signal whose duty factor represents the image signal 21. Since the frequency of the triangular pulse waveform signal 20 corresponds to the number of screen lines, to reduce the number of screen lines, the frequency of the triangular pulse waveform signal 20 should be reduced. In other words, the period of the triangular pulse wave signal should be increased.

Figure 3:
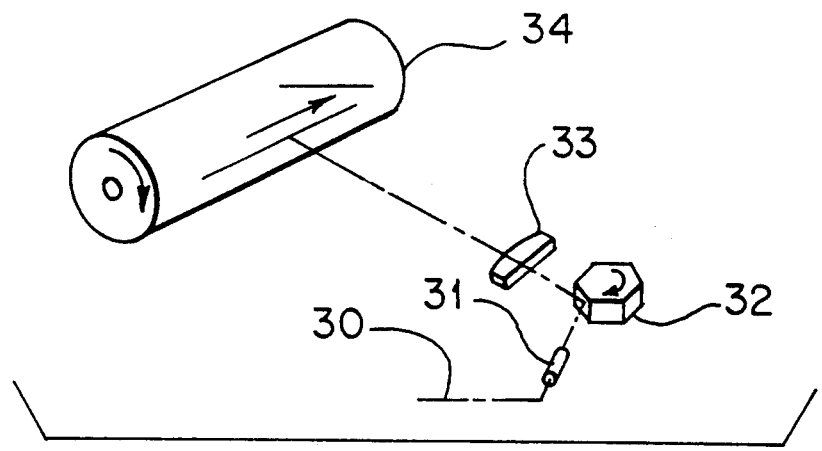
FIG. 3, is a schematic view of the optical system used in the image forming apparatus according to the present invention.

FIG. 3 shows the optical system used for image formation. A laser drive signal 22 drives a laser 31 through laser drive signal line 30, whereby the laser scans in a fast scan direction by reflection from a rotating polygonal mirror 32 and exposes a photoreceptor drum 34 through an f-$\theta$ lens. Thereafter an image is formed by the normal process of electrophotography.

In this embodiment, when the image is formed on paper, the frequency of the triangular pulse waveform signal is selected so that there are 200 screen lines per inch. On the other hand, the frequency of the triangular pulse waveform signal is selected to form 141 screen lines per inch when transparent overhead projector film is used. When an image such as that of a person is formed according to this embodiment on the transparent overhead projector film and is projected by an FXOHPZ1 (a trademark of Fuji Xerox Co., Ltd.) projector, contour does not occur. However, when the image is formed on transparent film with 200 screen lines per inch as in the case where paper is used, then contour occurs.

Figure 4:
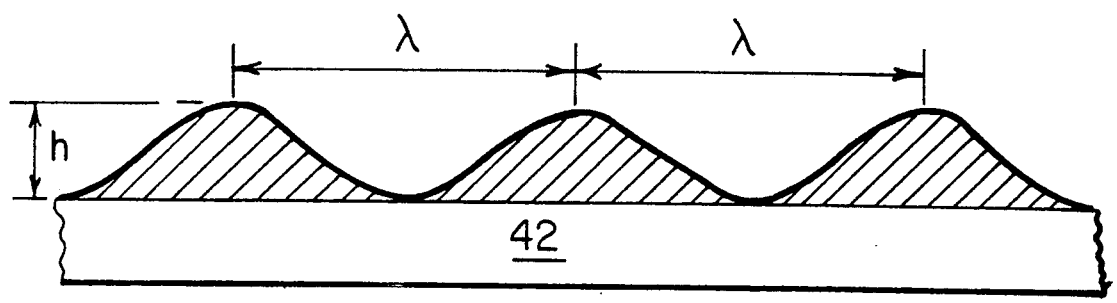
FIG. 4 is a cross-sectional view of the color toner image construction.

Further, to prevent the occurrence of contour, it is desirable that the height of the color toner image construction formed on the transparent film and the spatial frequency are simultaneously considered and the product of height of the image construction and the spatial frequency is arranged to be 0.036 or less. In the case where the image is formed on overhead projector film by a digital color copying machine, a regular unevenness of the height of the image construction h and the spatial frequency $1/\lambda$ appears as shown in FIG. 4. According to the results of research by the inventors of the present invention, the projected image has sufficient brightness and chroma and contour does not occur when the product $h/\lambda$ of the height of the image construction h and the spatial frequency $1/\lambda$ is 0.036 or less because, even though the refraction of the incident light occurs due to the unevenness of the surface of the toner image, the image can be projected by the optical system of the overhead projector.

With regard to this product $h/\lambda$, any combination of h and $1/\lambda$ is satisfactory, as long as $h/\lambda$ is 0.036 or less. However, in an image of 200 screen lines per inch ($\lambda = 127$ $\mu$m), for example, it is desirable that h is 2 $\mu$m or less even though contour does not occur if h is 4 $\mu$m or less. Also, in the case where height of the color toner image construction h is 5 $\mu$m, for example, contour does not occur if the number of screen lines is 182 per inch ($\lambda = 139$ $\mu$m) or less, but it is more desirable that the number of screen lines is 100 per inch ($\lambda = 254$ $\mu$m) or less.

To make the product $h/\lambda$ of the height of the color toner image construction h and the spatial frequency $1/\lambda$ 0.036 or less, the toner weight per unit area on the transparent film can be varied to change the value of h, and also the resolution can be varied to change the spatial frequency $1/\lambda$, thereby controlling $h/\lambda$.

Figure 5:
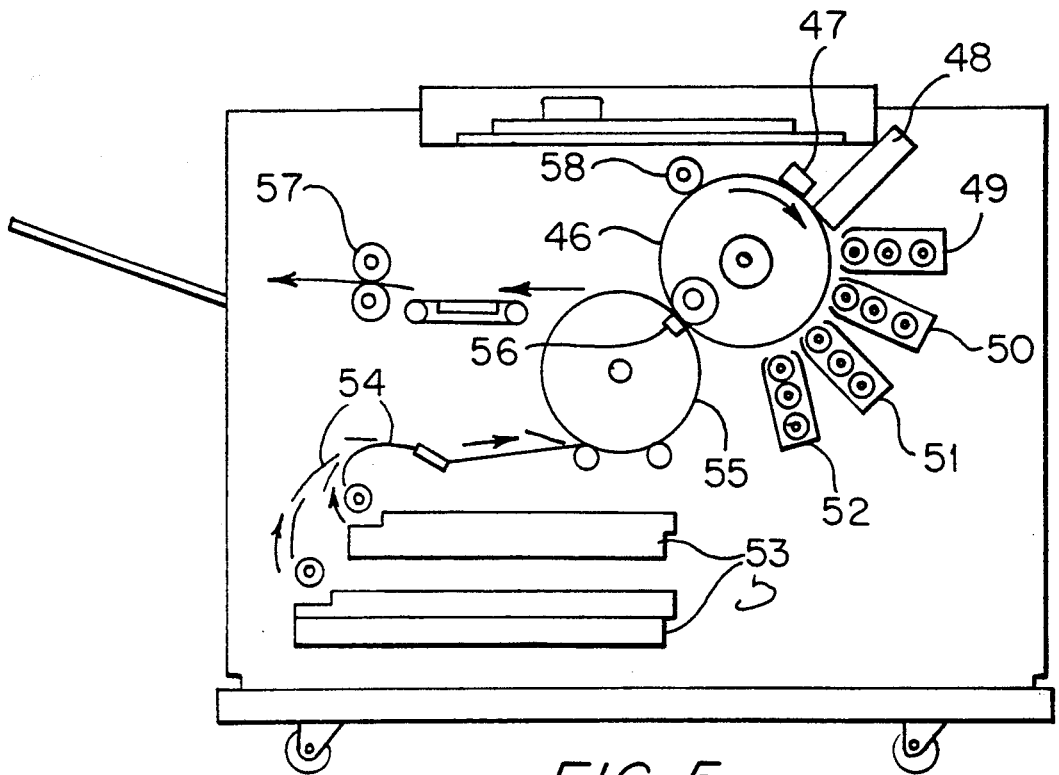
FIG. 5 is a schematic view of the structure of the color image forming apparatus used in the present invention.

FIG. 5 shows schematically the structure of the color image forming apparatus. A photoreceptor drum 46 is charged by a corona electrical charger 47 and then a laser scanner optical device 48 horizontally scans the photoreceptor drum 46 with a laser beam modulated by an image information signal to form an electrostatic latent image and then a laser beam modulated by an image information signal horizontally scans the photoreceptor drum 46 by a laser scanner optical device 48 to form an electrostatic latent image. Next, the image information signal, after forming the electrostatic latent image, selects one of a black developing device 49, a yellow developing device 50, a magenta developing device 51 and a cyan developing device 52 so that the selected developing device contacts the photoreceptor drum 46 on which the electrostatic latent image has been formed and the image is developed to generate a toner image. Meanwhile, the transfer medium (transparent overhead projector film) is transported by a feeding device 54 from a paper tray 53 to a transfer drum 55, and is then wrapped around the transfer drum 55. A corona electrical charger 56 provides a corona discharge to the back of the transparent overhead projector film, whereby the toner image is transferred to the film. To obtain a multi-color image, the transfer medium (transparent overhead projector film) is made to contact the photoreceptor drum 46 repeatedly, from two to four times, so that all or some of the toner images of cyan, magenta, yellow and black are overlaid. The transfer medium on which the transferred image is formed is then transported to a fuser 57, where the toner image is heated and fused and thus fixed on the transfer medium (transparent overhead projector film). Thus a color image can be obtained. The photoreceptor drum 46 is then cleaned by a cleaning device 58 to be prepared for reuse.

Next the method of changing the height of the color toner image construction h and the spatial frequency $1/\lambda$ will be described. The height of the image construction h varies in proportion to the toner weight per unit area on the transparent film. The toner weight can be controlled by adjustment of the toner concentration, the amount of electrical charge on the toner, the contrast in electrical potential which determines the developing process, the spacing between the electrostatic latent image and the developer carrying member, the developing bias voltage and the frequency, and so forth. The spatial frequency of the image construction can be changed by variation of the resolution.

Figure 7:
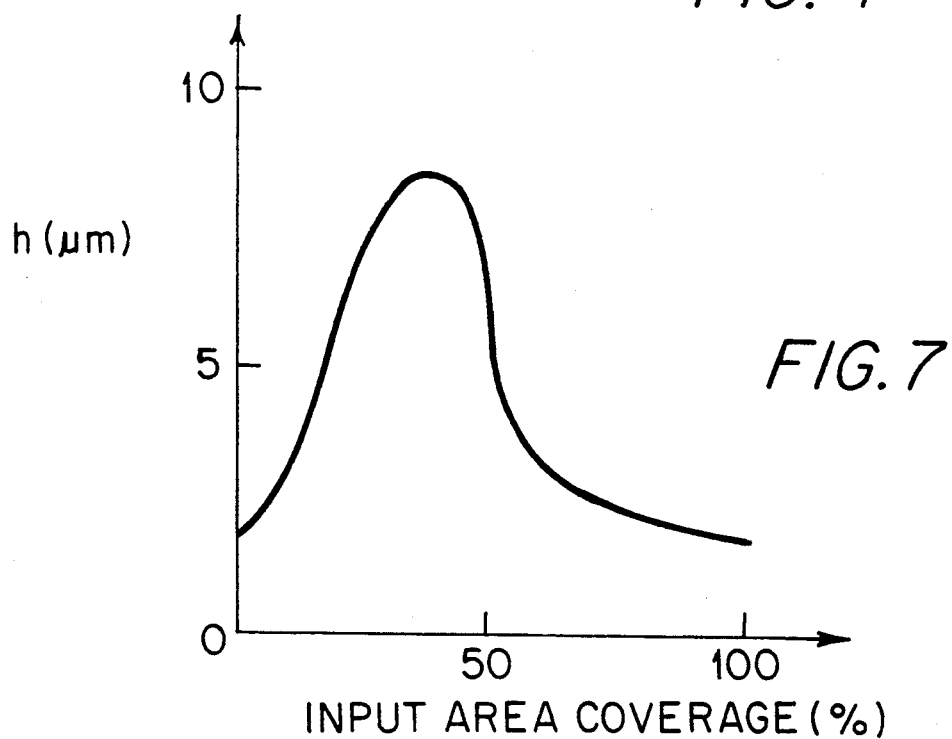
FIG. 7 is a graph showing the relation between input area coverage and the height of the image construction h.
Figures 6, 9:
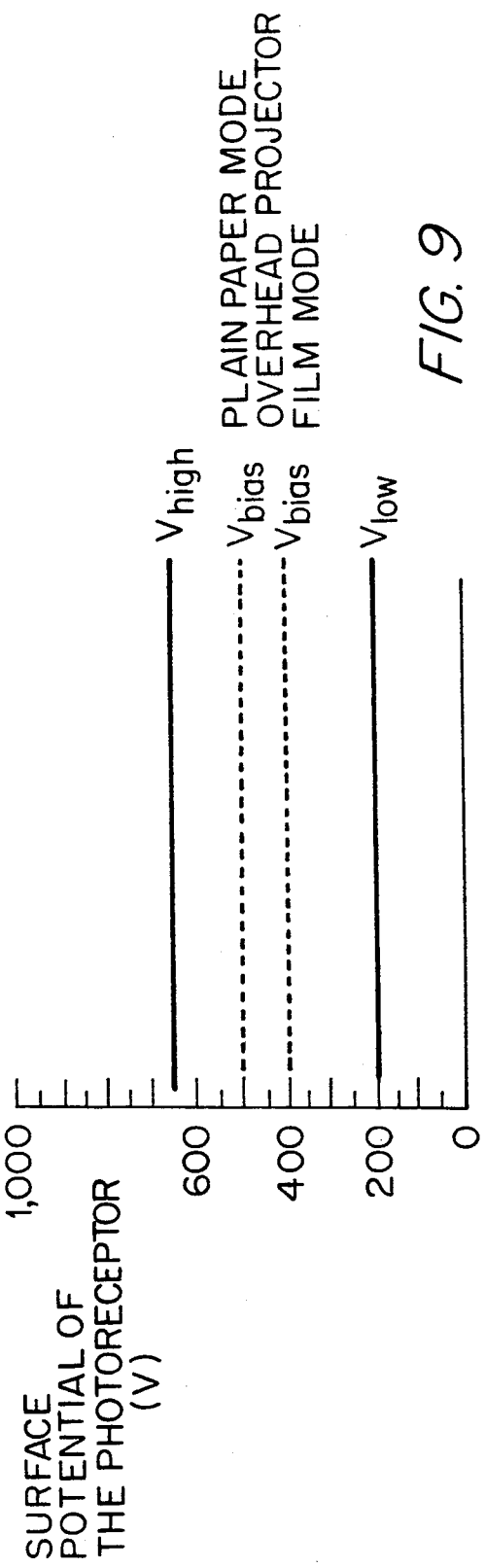
FIG. 6 is a table showing the relation between the change of height of the color toner image construction h and spatial frequency $1/\lambda$ and the occurrence of contour.
FIG. 9 is a graphical representation showing the predetermined values of developing bias potential for plain paper mode and transparent overhead projector film mode.

Results of experiments on changes of height of the color toner image construction h and the spatial frequency $1/\lambda$ are shown in the table in FIG. 6. Values of $h/\lambda$ of solid areas are all 0.036 or less and the areas have sufficient transparency, but, the graph in FIG. 7 shows that the height of the image construction h has its maximum value in the medium density portions. The values of $h/\lambda$ for the maximum h are given in FIG. 6.

If the value of $h/\lambda$ is 0.036 or less, contour does not occur on the projected image because sufficient transparency is obtained even in the medium density portions, as shown in FIG. 6.

If the height of the image construction h is reduced, the saturation of the projected color declines because the amount of the color components of the light absorbed by the toner layer is reduced. On the other hand, the resolution of the projected image must be diminished to make the spatial frequency $1/\lambda$ smaller. Consequently, if the chroma of the projected color is considered to be more important, the resolution should be diminished, whereas the height of the image construction h should be reduced if the resolution of the projected image is more important, so as to make the value of $h/\lambda$ 0.036 or less.

Second Embodiment

Figure 8:
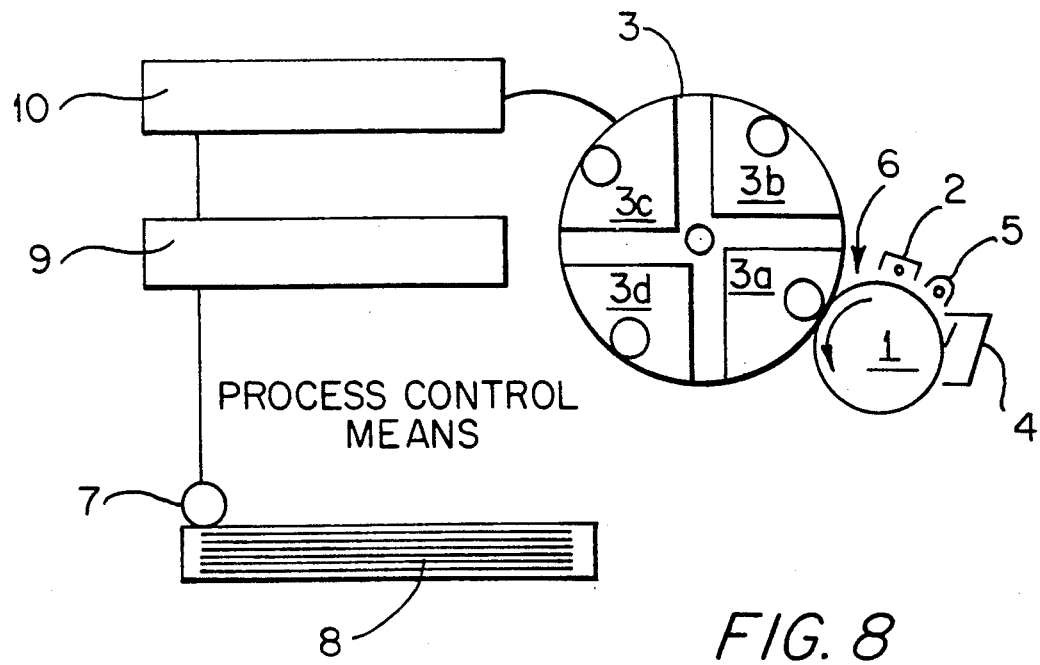
FIG. 8 is a schematic view of the structure of periphery of the developing device and a process control means.

The height of the color toner image construction h can be changed by changing the amount of toner fused on transparent overhead projector film changes. FIG. 8 is a schematic view of the structure of periphery of a developing device and means for process control of the electrophotographic copying machine as a typical image forming apparatus as an embodiment of the present invention. In this figure, numeral 1 is a photoreceptor drum, 2 is a corona electrical charger, 3a, 3b, 3c and 3d are developing devices, 4 is a cleaning device, 5 is an erasing lamp, 6 is exposing process, 7 is a transfer medium detecting means, 8 is a transfer medium, 9 is a process control means and 10 is a developing bias power supply. The transfer medium detecting means 7 consisting of a photointerrupter or the like differentiates between plain paper and transparent overhead projector film and the result of this differentiation is input to the process control means 9. According to the result of the determination of transfer medium, the process control means 9 transmits a command signal indicating the developing bias to the developing bias power supply 10 which provides a developing bias voltage to developing devices 3a, 3b, 3c and 3d in accordance with the command signal. In this embodiment, the developing bias voltages for plain paper and transparent overhead projector film are determined as shown in FIG. 9. The charged potential of the photoreceptor ($V_{high}$), the photoreceptor surface potential after exposure ($V_{low}$), the developing bias potential ($V_{bias}$) for plain paper and the developing bias potential for transparent overhead projector film are fixed at 650 V, 200 V, 500 V and 400 V, respectively. Because the developing contrast potential in the transparent overhead projector film mode is approximately ⅔ of the developing contrast potential in the plain paper mode, the toner weight on overhead projector film is approximately ⅔ of the toner weight on plain paper, making it possible to reduce the height of the image construction h sufficiently. The number of screen lines in this embodiment is 200 per inch ($\lambda = 127 \ \mu m$), and therefore, in the case that the developing contrast voltage is the same as that for plain paper, the height of the image construction h is 5 $\mu m$, and $h/\lambda$ is about 0.039, which causes contour to occur on the projected image. By fixing the developing contrast voltage for overhead projector film at ⅔ of that for plain paper, the height of the image construction h becomes about 3 $\mu m$ and $h/\lambda$ becomes 0.0234. Since $h/\lambda$ is smaller than 0.036, contour does not occur.

As mentioned before, there are several ways of controlling toner weight other than the method described in this embodiment, such as adjustment of the concentration of toner in the developer, control of the amount of electrical charge on the toner, adjustment of the contrast in electrical potential which determines the developing process, controlling the spacing between the electrostatic latent image and the developer carrying member and adjustment of the developing bias voltage and the frequency.

According to the present invention, an image of the appropriate high quality can be obtained based on the distinction of the transfer medium because the number of screen lines is changed by varying the period of the basic signal corresponding to the transfer medium.

For example, when an image is formed on a transparent overhead projector film, the unevenness of the surface of the toner image on the overhead projector film is diminished by decreasing the number of screen lines so that a projected image having high transparency, clear tones and no contour can be obtained. The transfer medium detecting circuit enables the normal screen line number to be adopted when plain paper is used as the transfer medium, and therefore, the resolution is not impaired. Moreover, there is no necessity to spray a solvent on the toner image or to abrade the surface of the image as conventional methods have done.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image forming apparatus comprising:
    an electrostatic latent image receiving member;
    an electrostatic latent image forming means for forming an electrostatic latent image corresponding to an image signal having a predetermined number of screen lines on said electrostatic latent image receiving member;
    a transfer medium detecting means for detecting the transfer medium; and
    a pulse width modulation means for modulating the pulse width of said image signal based on the detection result from said transfer medium detecting means.

2. An image forming apparatus according to claim 1, wherein said pulse width modulation means has a basic signal generating means for generating a basic signal to predetermine said number of screen lines and a basic signal frequency varying means for varying the frequency of said basic signal based on the detection result from said transfer medium detecting means, and modulates the pulse width of said image signal based on said basic signal whose frequency has been varied by said basic signal frequency varying means.

3. An image forming apparatus comprising:
    an electrostatic latent image receiving member;
    an electrostatic latent image forming means for forming an electrostatic latent image corresponding to an image signal on said electrostatic latent image receiving member;
    a developing means for attaching toner to said electrostatic latent image;
    a transfer medium detecting means for detecting the transfer medium; and
    a toner attaching amount control means for controlling the amount of toner attaching to said electrostatic latent image based on the detection result from said transfer medium detecting means.

4. An image forming apparatus according to claim 3, wherein said toner attaching amount control means comprises a developing bias voltage application means for applying a developing bias voltage to said developing means and a developing bias voltage control means for controlling the value of the developing bias voltage based on the detection result from said transfer medium detecting means.

5. An image forming method for forming a toner image corresponding to a digital image signal on a transparent film, comprising the steps of:
    detecting the transfer medium as being a transparent film; and
    controlling the height of a toner image construction h and/or spatial frequency of the toner image $1/\lambda$ so that $h/\lambda$ satisfies a predetermined condition.

6. An image forming method according to claim 5, wherein said predetermined condition is that the value is 0.036 or less.

* * * * *